United States Patent [19]

Norton

[11] Patent Number: 5,462,486
[45] Date of Patent: Oct. 31, 1995

[54] DRIVE REVERSING SYSTEM FOR THE FEEDER HOUSING OF AN COMBINE HARVESTER

[76] Inventor: R. Scott Norton, P.O. Box 23, Rocanville Saskatchewan, Canada, S9A 3L9

[21] Appl. No.: 155,120

[22] Filed: Nov. 22, 1993

[51] Int. Cl.$^6$ ............................. A01D 75/18; A01F 12/10
[52] U.S. Cl. ............................ 460/20; 460/70; 56/10.9; 56/11.2
[58] Field of Search ............................ 460/70, 16, 20; 56/10.9, 11.2, 11.9

[56] References Cited

U.S. PATENT DOCUMENTS

| | | | |
|---|---|---|---|
| 4,218,864 | 8/1980 | Allemeersch et al. | 56/11.2 |
| 4,430,847 | 2/1984 | Tourdot et al. | 56/11.2 X |
| 4,470,243 | 9/1984 | Rayfield | 56/11.2 |
| 4,663,919 | 5/1987 | Stroh et al. | 56/11.2 |

OTHER PUBLICATIONS

Photocopy of p. 20 of Prairie Farmers Catalogue 1992—Rodono Industries advertisement.

Primary Examiner—Terry Lee Melius
Attorney, Agent, or Firm—Adrian D. Battison; Murray E. Thrift

[57] ABSTRACT

A reverser system for the feeder chain of a combine harvester comprises a hydraulic motor mounted on a slide and operated by a cylinder to move from a retracted position to a forward operating position. In the operating position the mechanical coupling connects the shaft of the hydraulic motor to a drive sprocket connected to the feeder chain. Hydraulic fluid to the cylinder and to the hydraulic motor is tapped from the lift cylinders of the combine from a solenoid operated diverter valve. A control unit controls the supply of the pressurized fluid to the cylinder while delaying the supply of fluid to the hydraulic motor so that the mechanical coupling is connected while stationary before the hydraulic motor starts. This arrangement can be provided by simple mechanical devices providing an inexpensive drive system.

8 Claims, 2 Drawing Sheets

DRIVE REVERSING SYSTEM FOR THE FEEDER HOUSING OF AN COMBINE HARVESTER

BACKGROUND OF THE INVENTION

This invention relates to an apparatus for mounting on the feeder housing of a combine harvester to drive reverse rotation of the combine harvester feeder housing to release blockages.

It is a well known problem on the feeder housing of a combine harvester that excessive feed of crop material can occur and cause a blockage. Many devices have been proposed and are available for reversing the drive to automatically release the blockage by propelling the excess material back down the feeder housing to the header.

One proposed device comprises an electric motor of the type used as a starter motor in an automobile. When the motor is actuated it moves into engagement with the drive chain to the feed elements of the feeder housing and acts to reverse the drive chain.

It is of course necessary to maintain the reverse drive system so that it does not interfere with the normal forward drive system of the combine. In the electric motor arrangement, this is effected by retracting the motor from the drive system.

The electric motor is however disadvantageous in that it requires a significant level of power to be drawn from the battery of the combine harvester. The battery power is not intended to provide this amount of power and accordingly the reversing system generates an excessive load on the battery and alternator system.

An alternative arrangement has been proposed utilizing a hydraulic motor which is connected to the drive chain through a torque converter arrangement permanently attached to the chain. The hydraulic motor therefore does not interfere with the normal forward rotation of the chain, but when the chain is stopped, the hydraulic motor can be brought into action and drive the chain in the reverse direction through the torque converter arrangement. This construction is however disadvantageous in view of the fact that it is relatively complex and therefore relatively expensive and is difficult to repair on breakdown.

It is one object of the present invention, therefore, to provide an improved hydraulic drive system for reversing the drive of the feeder housing of a combine harvester.

SUMMARY OF THE INVENTION

According to one aspect of the invention there is provided an apparatus for reversing drive of the feeder housing drive chain of a combine harvester comprising a sprocket for driving the drive chain, a hydraulic motor having an output drive shaft, a hydraulic cylinder arranged to move the motor in a direction longitudinal of the drive shaft thereof from a retracted position to an operating position, a mechanical coupling between the sprocket and the output drive shaft for communicating drive from the output drive shaft to the sprocket and including a portion thereof mounted on the output drive shaft movable therewith so as to be released from communicating drive in the retracted position and so as to communicate drive in the operating position, means for connection to a source of hydraulic fluid under pressure and control means for receiving the hydraulic fluid and for directing the fluid to the cylinder and to the motor, the control means being arranged to prevent communication of fluid to the motor to start the motor until the cylinder is actuated to cause said movement to the operating position.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
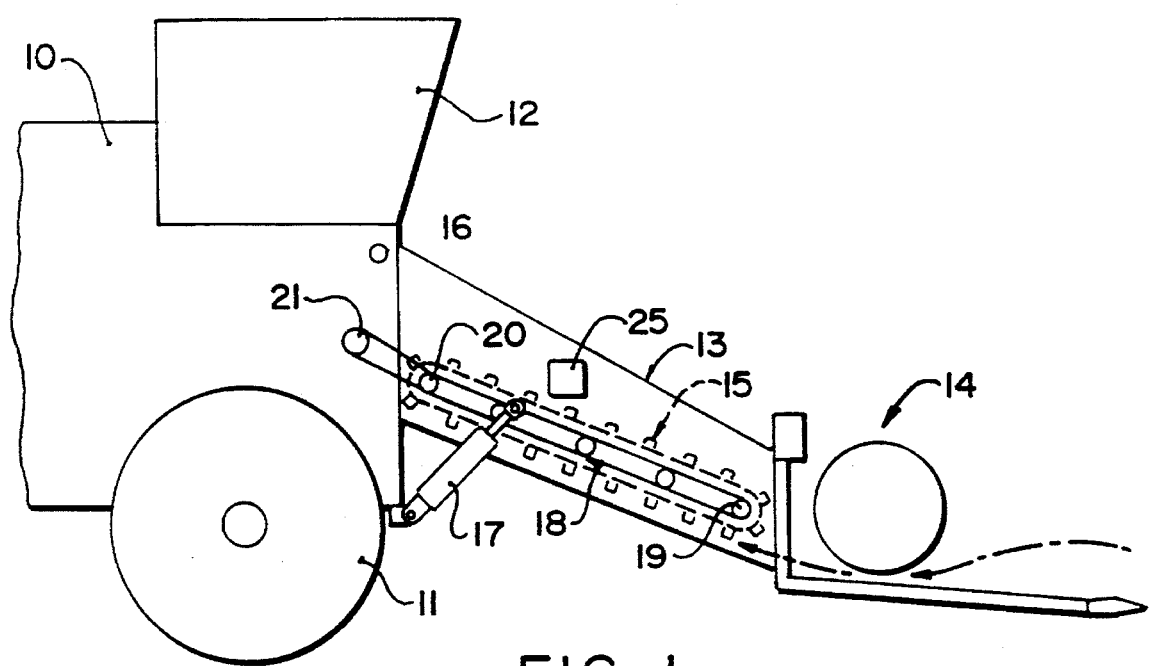
FIG. 1 is schematic side elevation of the forward portion of a combine harvester showing the location of the reverser drive system.

A combine harvester is schematically in FIG. 1 and comprises a harvester body 10 mounted on ground wheels 11 and including a cab 12. The harvester includes a feeder housing 13 with a header 14 mounted at a forward end of the feeder housing. Within the feeder housing is provided a feeder chain 15 which carries the crop material upwardly of the feeder housing into the combine body for processing. The feeder housing is pivotally mounted on the combine body for pivotal movement about a pivot schematically indicated at 16 for raising and lowering the header 14. This movement is effected by lift cylinder 17 connected between the feeder housing and the frame of the combine body. The feeder chain 15 includes crop engaging elements transversely of the feeder housing. The feeder chain is driven by a drive chain 18 mounted on a side surface outwardly of the feeder housing. The chain is mounted on sprockets 19 and 20 and is driven by suitable drive system from a drive shaft 21.

The above arrangement is entirely conventional and acts to cut and transport the crop into the combine harvester body for processing. If the amount of crop exceeds an allowable maximum, it is possible for the feeder chain 15 to become jammed and for this purpose a reverser drive device 25 is provided shown schematically in FIG. 1 and illustrated in more detail in FIG. 2.

Figure 2:
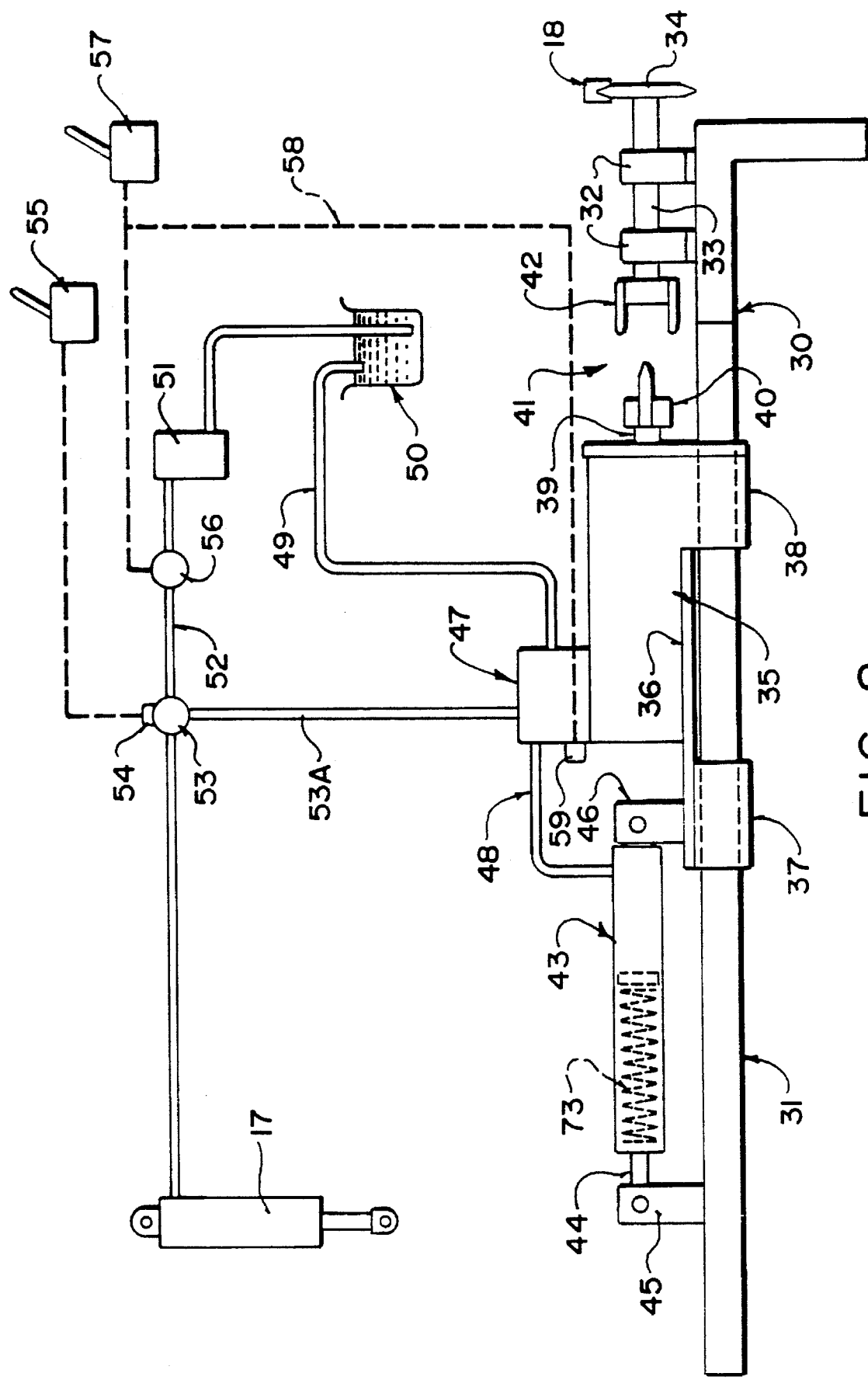
FIG. 2 is a view longitudinally of the feeder housing showing the construction of the reverser drive assembly.

In FIG. 2, therefore, the reversing system comprises a bracket 30 for mounting on the side wall of the feeder housing so that a horizontal portion 31 projects outwardly to one side. The bracket includes a pair of mounting bearings 32 supporting a shaft 33 carrying a sprocket 34 engaged with the drive chain 18. The sprocket is permanently engaged with the chain 18 so that it is driven by the chain when the chain is in normal operation but can drive the chain when the chain is halted and the reversing devices brought into operation.

The device further includes a hydraulic motor 35 mounted on a support plate 36 carrying a pair of slide members 37 and 38 slidable longitudinally of the support element 31. The hydraulic motor includes an output drive shaft 38 which is rotated on supply of hydraulic fluid under pressure to the hydraulic motor. The shaft carries a first part 40 of a mechanical coupling 41 a second part 42 of which is mounted on the end of the shaft 33 remote from the sprocket 34. The mechanical connection thus provides a positive coupling when the shaft and hydraulic motor are moved forwardly into an operating position and the mechanical connection is completely released when the hydraulic matter on the shaft are moved into a retracted position as shown in FIG. 2. The mechanical connection is arranged so that forward movement causes the elements thereof to slip into engagement regardless of the original orientation of the parts provided of course the parts are stationary as the chain 18 is stationary and the shaft 38 is stationary.

Movement of the hydraulic motor and the support bracket 36 is effected by a cylinder 43 having a piston rod 44 connected to a bracket 45 carried on the support element 31. The cylinder is coupled to a bracket 46 carried on the support plate 36.

A control unit 47 is mounted on the hydraulic motor at a suitable location for controlling a supply of fluid to the cylinder 43 through a coupling hose 48 and to the hydraulic motor to an outlet duct directly connected thereto and therefore not visible in FIG. 2. A further hose 49 provides a return to the conventional return tank 50 on the combine harvester. The hydraulic system further includes a pump 51 receiving fluid from the tank 50 and pressurizing this into a supply line 52 directed to the lift cylinder 17. Supply line 52 is of course only one of the supply lines pressurized by the pump 51 and is of course conventional in the combine harvester.

The supply to the control unit 47 is tapped from the supply line 52 via a diverter valve 53 which can be operated by a solenoid 54 to control the supply of fluid either to the lift cylinder 17 or to the control unit 47. In the normal position of the solenoid the fluid is supply normally to the lift cylinder 17. When the solenoid is actuated the fluid is supplied to the control unit 47and actuated is effected by an electrical switch 55 provided in the cab. A conventional valve 56 controls the supply of fluid from the pump 51 into the supply line 52. This is actuated by an actuation member 57 in the cab and again is of course conventional for actuating the lift cylinders. However the system of the present invention incorporates an additional control line 58 which operates a second solenoid valve 59 provided on the control unit and shown in more detail in FIG. 3.

Figure 3:
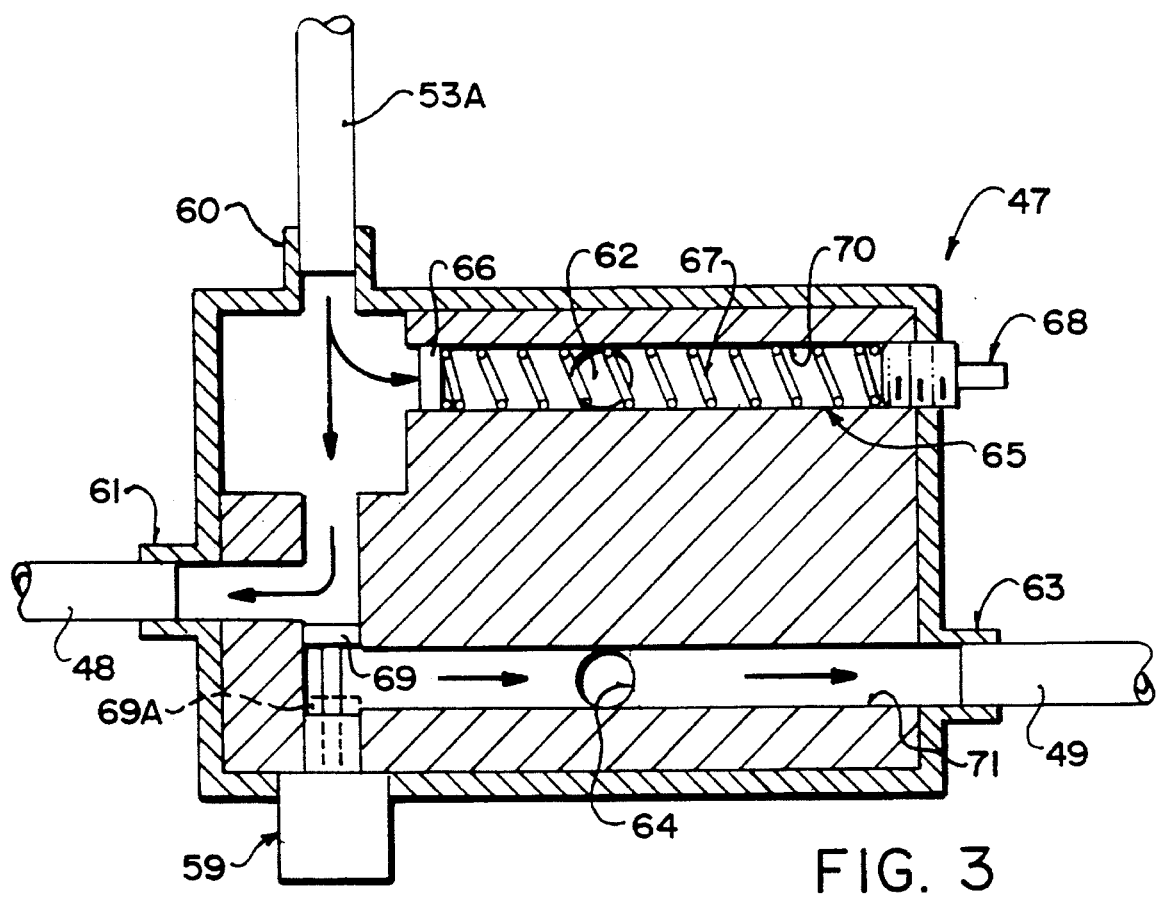
FIG. 3 is a schematic cross sectional view showing the construction of the control unit of FIG. 1.

Turning now to FIG. 3, the control unit 47 is shown in more detail and includes a first port 60 connected to a supply line 53A from the valve 53. The body includes a second port 61 for supplying fluid to the supply line 48 to the cylinder 43. The body includes a third port 62 for connection of pressurized fluid to the hydraulic motor. The body includes a fourth port 63 for connecting to the drain line 49. A fifth port 64 is connected to the return line from the hydraulic motor. The body further includes a sequence valve 65 having a piston 66 and a spring 67, the tension of the spring being settable by a manually operable screw 68.

The solenoid valve 59 includes a piston 69 which in a normal position of the solenoid is in a retracted location indicated at 69A and in actuated position of the solenoid is moved to the position indicated in full line at 69.

In operation on obtaining a condition in which it is required to operate the reverser device, the control 55 is operated in the cab to actuate the valve 53 to divert the hydraulic fluid from the line 52 into the line 53A. After this is complete, the control 57 is actuated in the cab which supplies the pressurized fluid through the line 52 to the control unit at the port 60 and simultaneously actuates the solenoid valve 59 to move the piston 69 into the raised position shown in FIG. 3. The fluid from the port 60 is therefore communicated through the interior of the body of the control unit into the port 61 for actuating the cylinder 43. The preset sequence valve 65 is mounted in a duct 70 with the piston 66 closing the duct 70 at a forward end of the duct. The piston 66 therefore initially prevents the fluid from being communicated to the port 62 of the hydraulic motor. Only when the cylinder has been fully actuated and reaches its end stop does the pressure in the body of the control unit raise to a level in which it actuates the piston 66 against the pressure of the spring 67 to push the piston rearwardly in the duct 70 to a position exposing the port 62 and allowing the flow of fluid to the hydraulic motor.

The actuation of the cylinder 43 therefore moves the hydraulic motor forwardly to couple the mechanical connection 41 prior to the hydraulic motor starting movement so that the mechanical connection can be coupled. Once the coupling is complete, the hydraulic motor is started by the actuation of the sequence valve as described above.

These steps therefore effect actuation of the reversing system and drives the feeder chain in the reverser direction to clear any blockages. When this is complete as observed by the operator, the control 57 is actuated to halt the supply of fluid to the line 52. This also releases the valve 59 to move back to the retracted position indicated at 69A so that the fluid from the cylinder at the port 48 is free to flow to the outlet port 63 through a duct 71. The cylinder is an automatic retract cylinder including a spring 73 shown schematically in FIG. 2. The spring therefore acts to attract the hydraulic motor to disconnect the mechanical coupling 41 with the fluid expelled from the cylinder passing from the port 61 over the retracted valve piston 69 to the port 63. At this time the control 55 is operated to return the diverter valve to its normal condition so that the line 52 feeds the lift cylinders 17. The normal position of the valve 59 allows communication between the cylinder and the return line 49 so that there is no possibility of the cylinder becoming inadvertently pressurized for example by fluid leaking past the valve 53 into the line 53A. This prevents any inadvertent operation of the cylinder to move the hydraulic motor forwardly which could cause engagement of the mechanical coupling while the chain is being driven with the possibility of damage to the equipment.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combine harvester comprising a combine harvester body including a feeder housing, a drive member for driving crop drive elements within the feeder housing and apparatus for reversing drive of the drive member for reversing the drive elements comprising a drive element for driving the drive member, a support frame for attachment to the combine harvester body, a hydraulic motor mounted on the support frame for sliding movement relative thereto and having an output drive shaft, a hydraulic cylinder having one end attached to the support frame and a second end attached to the motor and arranged to move the motor in said sliding movement relative to the support frame in a direction longitudinal of the drive shaft thereof from a retracted position to an operating position, a mechanical drive coupling between the drive element and the output drive shaft for communicating drive from the output drive shaft to the drive element and including a portion thereof mounted on the output drive shaft movable with the motor and the output drive shaft so as to be released from communicating drive to the drive element in the retracted position and so as to communicate drive to the drive element in the operating position, connection means for connection to a source of hydraulic fluid under pressure and control valve means for receiving the hydraulic fluid and for directing the fluid to the cylinder and to the motor, said control valve means having a first port for receiving fluid from said connection means, a second port for communicating fluid to the cylinder, a third port for communicating fluid to the motor and a sequence valve arranged to prevent communication of fluid to the third port until the pressure of fluid within the body exceeds a predetermined pressure in response to movement of the cylinder to an extreme position thereof.

2. The combine harvester according to claim 1 including spring means for retracting the cylinder to the retracted position.

3. The combine harvester according to claim 1 wherein the sequence valve comprises a cylinder arranged for communicating fluid from the first port to the third port, a piston mounted within the cylinder and spring means biasing the piston to a position within the cylinder between the first port and the third port such that the spring means holds the piston to a position preventing flow of fluid to the third port until the pressure exceeds pressure generated by the spring to move the piston within the cylinder to a position beyond the third port.

4. The combine harvester according to claim 1 wherein the control valve means includes a fourth port for communicating fluid to a return tank.

5. The combine harvester according to claim 4 wherein the control valve means includes a solenoid actuated valve operable to move from a normal position to an actuated position, wherein in the normal position there is provided a direct connection between the second port and the fourth port and wherein in the actuated position the valve closes the direct connection from the second port to the fourth port so that the fluid from the first port is communicated to the second port for actuating the cylinder.

6. The combine harvester according to claim 1 including lift cylinder means for lifting the feeder housing relative to the combine harvester body and wherein the connection means is connected to a supply line to the lift cylinder means.

7. The combine harvester according to claim 6 including electrically operated valve means for diverting fluid from the lift cylinder means to the control valve means.

8. The combine harvester according to claim 7 wherein the control valve means includes a fourth port for communicating fluid to a return tank, wherein the control valve means includes a solenoid actuated valve operable to move from a normal position in which there is provided a direct connection between the second port and the fourth port to an actuated position in which the direct connection from the second port to the fourth port is closed so that the fluid from the first port is communicated to the second port for actuating the cylinder and wherein there is provided manually operable control means for actuating supply of fluid to the supply line to the lift cylinder means, said manually operable control means having associated therewith means for actuating said solenoid actuated valve.

\* \* \* \* \*